(12) United States Patent
Schemeley

(10) Patent No.: US 7,650,716 B1
(45) Date of Patent: Jan. 26, 2010

(54) PLANT PROTECTION APPARATUS

(75) Inventor: James Brian Schemeley, 6945 Regents Ct., Apt. 305, Frederick, MD (US) 21703

(73) Assignee: James Brian Schemeley, Walkersville, MD (US)

( * ) Notice: Subject to any disclaimer, the term of this patent is extended or adjusted under 35 U.S.C. 154(b) by 9 days.

(21) Appl. No.: 12/314,542

(22) Filed: Dec. 12, 2008

(51) Int. Cl.
*A01G 13/02* (2006.01)

(52) U.S. Cl. ............... 47/23.1; 47/29.6; 47/30; 47/31

(58) Field of Classification Search .......... 47/20.1, 47/23.1, 23.2, 23.3, 29.1, 29.2, 29.3, 29.5, 47/29.6, 30, 31, 31.1, 19.1; 135/139, 141
See application file for complete search history.

(56) References Cited

U.S. PATENT DOCUMENTS

| | | |
|---|---|---|
| 461,204 A | 10/1891 | Bourne |
| 558,346 A | 4/1896 | Boyd |
| 831,706 A | 9/1906 | Clarke |
| 935,057 A | 9/1909 | Roberts |
| 947,519 A | 1/1910 | McAdie |
| 1,144,663 A | 6/1915 | Merriman |
| 1,407,125 A | 2/1922 | Carroll |
| 1,461,110 A | 7/1923 | Cox |
| 1,848,345 A | 3/1932 | Gregg |
| 1,933,280 A | 10/1933 | Righter |
| 2,009,867 A | 7/1935 | Ball |
| 2,014,175 A | 9/1935 | Hart |
| 2,051,643 A | 8/1936 | Morrison |
| 2,141,484 A | 12/1938 | Piglia |
| 2,197,929 A | 4/1940 | Hale |
| 2,953,870 A | 9/1960 | Nelson |
| 3,360,884 A | 1/1968 | Budd |
| 3,384,992 A | 5/1968 | Heffron |
| 3,706,160 A | 12/1972 | Deibert |
| 3,846,935 A | 11/1974 | Wagner |
| 4,197,673 A | 4/1980 | Thomas |
| 4,829,707 A | 5/1989 | Koffler et al. |
| 5,323,559 A * | 6/1994 | Allman .......................... 47/45 |
| 6,006,469 A | 12/1999 | DeMatties |
| 6,098,335 A * | 8/2000 | Brown, Jr. ..................... 47/17 |
| 6,311,427 B1 | 11/2001 | McNally |
| 6,758,014 B2 | 7/2004 | Chen |
| 6,944,989 B1 | 9/2005 | Bradley |

\* cited by examiner

*Primary Examiner*—T. Nguyen
(74) *Attorney, Agent, or Firm*—Buchanan Ingersoll & Rooney PC

(57) ABSTRACT

Disclosed herein is an adjustable protective enclosure for trees or shrubs, comprising: a first enclosing portion having a upper region, and a lower region adapted to contact the ground, and comprising a plurality of longitudinally extending panels, each panel comprising a plurality first longitudinal members and a plurality of first transverse members, wherein the first longitudinal members and the first transverse members of a panel are attached to one another to form one or more first rigid frameworks; at least a portion of the longitudinal members or at least a portion of the transverse members, or both, are adjustable in length; each panel is adjustably attached to two adjacent panels to enclose one or more trees or shrubs; a second enclosing portion attached to the first enclosing portion in the upper region thereof, and comprising a plurality of second longitudinal members and a one or more second transverse members, wherein the second longitudinal members and second transverse members form one or more second rigid frameworks; a first covering removably disposed around the first enclosing portion; a second covering removably disposed around the second enclosing portion.

15 Claims, 3 Drawing Sheets

PLANT PROTECTION APPARATUS

BACKGROUND

1. Field

Disclosed herein is an apparatus and method of using the same to protect from damage by the elements plants, including ornamental plants, shrubs, and trees, as well as non-ornamental or crop-bearing shrubs and trees. In particular, the apparatus and method are easily set up and taken down from around the plants, and can therefore be deployed quickly when damaging weather is predicted to be immanent. The apparatus and method disclosed herein are particularly helpful in protecting the plants from damage by ice forming thereon, as well as from damage occurring during hail, snow, sleet, freezing rain, the like.

2. Description of the Related Art

Current and past housing trends emphasize housing that provides outdoor living space, and the enhanced desirability of these outdoor spaces provided by landscaping. At the same time, in many real estate markets, particularly in urban and suburban areas, housing is developed on smaller lots, resulting in higher housing densities. Often, housing developers and homeowners spend considerably sums of money in landscaping their properties, including a significant amount spent on planting and maintaining ornamental plants, trees, and shrubs. These are provided both to enhance the livability of the outdoor space, providing shade and a visually appealing environment, and to screen housing from adjacent neighboring properties, thereby providing more privacy.

At the same time, apparent changes to climate may be rendering weather increasingly unpredictable, and in some cases, more severe. Weather-related damage to plants, trees and shrubs that are provided as ornamental landscaping and to trees and shrubs that provide fruit and other crops can become extremely expensive, particularly in winter. One particular problem is the damage resulting from ice forming on the plants. Sleet or freezing rain storms, even when followed by thawing, can severely damage ornamental and agricultural trees and shrubs. One source of damage can result from the freezing through of relatively young, thin branches, as they become coated with ice, disrupting the cells of the plant and, in some cases, killing it. Another source of damage results from the increase in weight caused by icing of the plant's branches. This increase in weight can weaken the branches, in some cases causing them to break and fall. These falling, frozen, heavy branches can cause other property damage when they strike objects below them, and can result in permanent damage to the plant. The broken-off branches provide an ingress point for diseases and insects, which can cause further damage to the plant, often necessitating its replacement.

Attempts have been made to provide winterizing systems or apparatus for plants, shrubs, and trees. However, these systems are generally either permanent, or else difficult to put up and take down. In some cases, the systems require the use of some form of heat transfer system that is alleged to remove heat from the ground and provide this heat to the air around the plant. This, however, increases the cost and complexity of the system, and is of dubious utility when the ground around the plant is frozen solid. Other protecting systems are of limited stability, e.g., using a single point of attachment to the ground, or requiring attachment to the plant itself. This limited stability can actually do more harm to the plant, since the protective system is subject to being toppled over in wind, and thus imposes additional stress on the plant by leaning against the plant or pulling the plant towards the ground. In addition, prior systems are not easily adjustable or scalable to expand as the plant grows.

Accordingly, there remains a need for a plant protection apparatus that is not subject to these deficiencies and problems, and that can be easily deployed to protect plants, shrubs, and trees, that does not require any complex or expensive heat transfer apparatus, that is stable, and that is adjustable, and/or modular, to allow for expandability and/or reusability of the modules thereof to protect different plants.

SUMMARY

The plant protection apparatus described herein satisfies these needs.

In one embodiment, the plant protection apparatus relates to an adjustable protective enclosure for trees or shrubs, comprising:

a first enclosing portion having a upper region, and a lower region adapted to contact the ground, and comprising a plurality of longitudinally extending panels, each panel comprising a plurality first longitudinally extending members and a plurality of first transverse members, wherein the first longitudinally extending members and the first transverse members of a panel are attached to one another to form one or more first rigid frameworks;

at least a portion of the longitudinally extending members or at least a portion of the transverse members, or both, are adjustable in length;

each panel is adjustably attached to two adjacent panels to enclose one or more trees or shrubs;

a second enclosing portion attached to the first enclosing portion in the upper region thereof, and comprising a plurality of second longitudinally extending members and a one or more second transverse members, wherein the second longitudinally extending members and second transverse members form one or more second rigid frameworks;

a first covering removably disposed around the first enclosing portion;

a second covering removably disposed around the second enclosing portion.

BRIEF DESCRIPTION OF THE DRAWING FIGURES

The plant protection apparatus may be understood more clearly by reference to the attached drawings of an exemplary embodiment thereof. The drawings are not intended to limit the scope of the appended claims.

FIG. 1*a* is a front elevation view of one embodiment of the plant protection apparatus described herein. FIG. 1*b* is a top plan view of the embodiment of the plant protection apparatus of FIG. 1*a*.

DETAILED DESCRIPTION OF SPECIFIC EMBODIMENTS

The plant protection device disclosed herein can be more clearly understood by reference to the drawings and to various specific embodiments thereof, which are not intended to limit the scope of the appended claims.

Figure 1B:
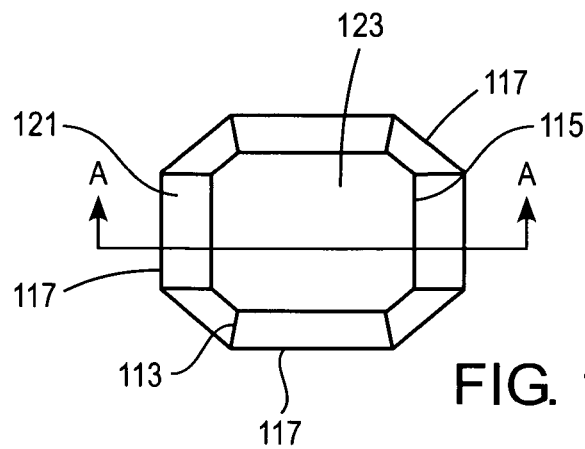
Figure 1A:
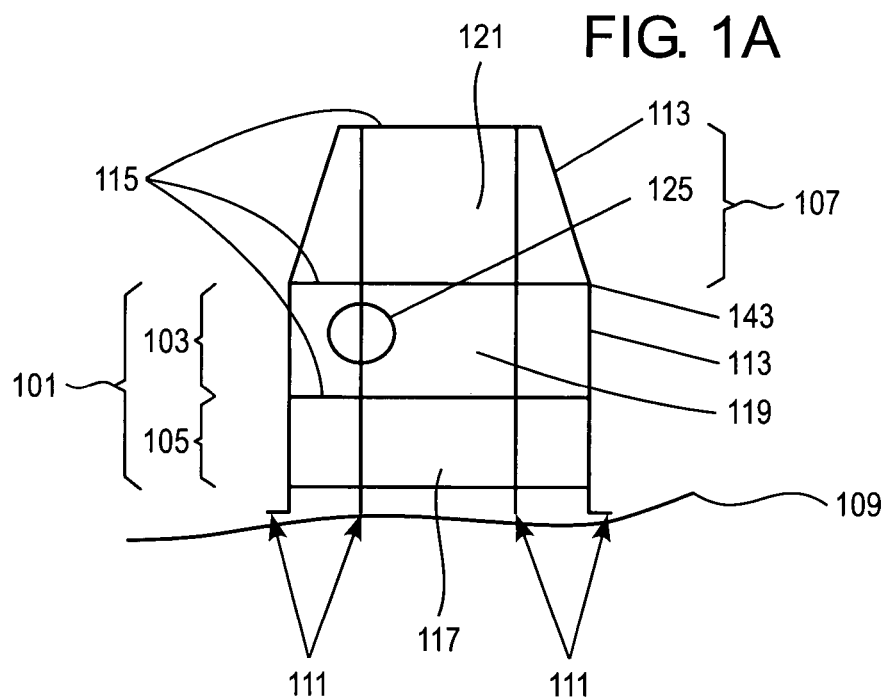

One embodiment of the plant protection device disclosed herein is shown in FIG. 1. FIG. 1a shows a front elevation view of this embodiment, wherein the first enclosing portion 101 contains an upper region 103 and a lower region 105. Upper region 103 connects to second enclosing portion 107, while lower region 105 is secured to the ground 109 or other surface, via anchoring means 111.

Anchoring means 111 can include pins, pegs, ground plates, spikes, or other fasteners for holding the device to the ground and preventing it from moving laterally or blowing over in wind. Alternatively, anchoring means 111 can be simply an extension of longitudinally extending members 113 of the lower region 105, which can be inserted into soil or other soft or friable surface.

Both upper region 103 and lower region 105 of first enclosing portion 101 and second enclosing portion 107 can contain plurality of longitudinally extending members 113 and transverse members 115. These longitudinally extending members and transverse members can be grouped into a plurality of panels 117, which can be seen more clearly by reference to FIG. 1b. These panels may be separate pre-fabricated pieces, or may be assembled separately to impart a high degree of modularity to the system. Alternatively, panels 117 may be integrated together, so that the device consists of a single framework that surrounds the plant. Such an embodiment is particularly suited to protecting smaller trees and shrubs.

The longitudinally extending members 113 and transverse members 115 are connected together to form rigid frameworks. As used herein, the term "rigid" means sufficiently inflexible to impart structural stability to the apparatus and resist slight wind, but sufficiently flexible as to yield slightly in stronger winds, so as to bend without breaking. Suitable materials for these frameworks include steel, such as tubular steel, aluminum, such as tubular aluminum, and high-strength plastics, including materials such as ABS, polycarbonates, high density polyolefins, such as polyethylene and polypropylene, polyamides, such as nylon, polyesters, such as PET, and the like. As explained in more detail below, the some or all of the longitudinally extending members 113 and some or all of the transverse members 115 are adjustable in length, so that the resulting panels can be varied in size and shape to accommodate a variety of different plants.

In the particular embodiments shown, the longitudinal members 113 of second enclosing portion 107 are angled inward with respect to the longitudinal members 113 of first enclosing portion 101. However, other designs are also possible, including longitudinally extending members that are not inclined or angled, or that angle outward.

Surrounding the first enclosing portion 101 is first covering 119, which can be made of a woven fabric, a nonwoven fabric, a film, or a combination of these (for example, in a laminate). First covering 119 can be transparent, translucent, or opaque. In a particular embodiment, a transparent or translucent covering can be used, as this will allow sunlight to penetrate within the enclosure formed by the device and reach the plant within. In addition, solar heating that results from such a transparent or translucent covering can help to keep the plant warm via a "greenhouse" mechanism. A similar covering can be used as second covering 121, which surrounds enclosing portion 107. Second covering 121 can be of the same material as first covering 119 (and, in a particular embodiment, can be integral with first covering 119), or can be of a different material. Each of first covering 119 and second covering 121 may have one or more drawstrings or other means to tighten them around the first or second enclosing portions.

FIG. 1b, which is a top view of the embodiment shown in FIG. 1a, contains a central panel 123. This central panel may be open (i.e., not covered by second covering 121) or may be closed (i.e., covered by second covering 121 or by another panel of covering material).

Figure 2:
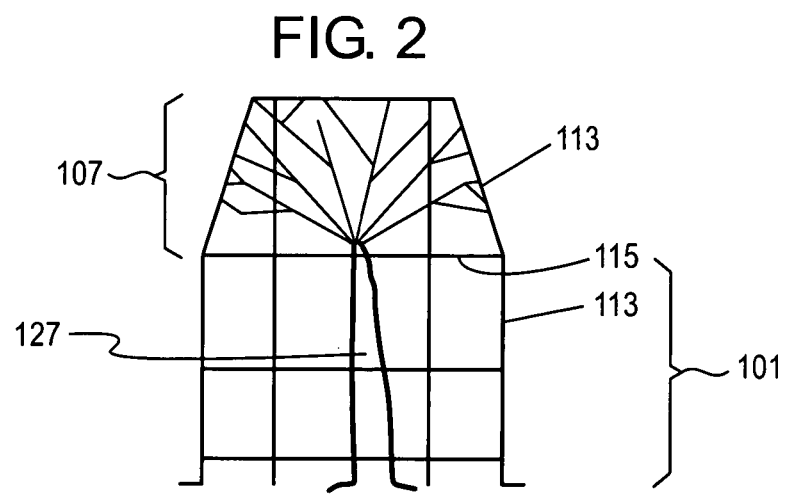
FIG. 2 is a cross sectional view of the embodiment of the plant protection apparatus of FIG. 1*a*, taken along section line A-A of FIG. 1*b*.

FIG. 2 is a cross-sectional view of the embodiment shown in FIG. 1a and FIG. 1b, taken along section line A-A in FIG. 2. The arrangement of the device around plant 127 can be more clearly seen in this view, which also illustrates a more particular feature of some embodiments of the device, namely that the inclined longitudinal members 113 of second enclosing portion 107 approach the foliage of the plant, providing less open air space near them. While not wishing to be bound by any theory, it is believed that this feature helps to keep moisture-laden air and precipitation away from the branches of the plant, thereby helping to prevent ice from forming thereon.

Figure 3:
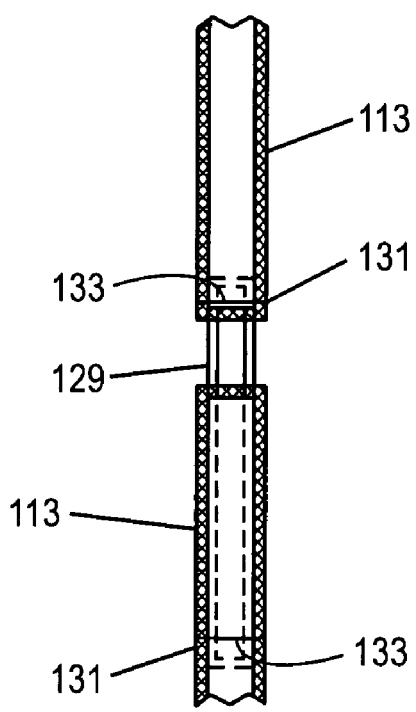
FIG. 3 is a magnified view of a portion of the embodiment of the plant protection apparatus of FIG. 1, showing one embodiment of an adjustability mechanism.

As indicated above, a feature of the device disclosed herein is that at least some longitudinal members 113 and, optionally, at least some transverse members 115 are adjustable in length. An embodiment of an adjustment mechanism to achieve this shown in a magnified view of the portion of FIG. 1a indicated by reference numeral 125. This magnified view is shown in FIG. 3, in partially cut-away form so that the mechanism for imparting adjustability can be more easily seen. In this embodiment, longitudinal member 113 is a hollow tubular member, at least in the region of the adjustment mechanism, and forms two separate pieces in that region. Disposed within this hollow tube is a tube or bar 129 of diameter slightly smaller than the internal diameter of the longitudinal member 113. This tube or bar 129 may be made of a material the same as, or different from, longitudinal member 113. Tube or bar 129 is slidably disposed within the two pieces of longitudinal member 113. Each of pieces of longitudinal member 113 contain a pair of holes 131 which can receive a removable transverse pin 133. A plurality of corresponding pairs of holes are provided in the tube or bar 129, so that the pins can be inserted through a pair of holes in tube or bar 129 at each piece of longitudinal member 113, so that the entire longitudinal member 113 has the desired length.

It will be recognized that this illustrated embodiment of telescoping tube adjustment mechanism can be varied without departing from the spirit and scope of the concept described herein. For example, multiple pairs of holes can be provided in the pieces of longitudinal member 113 instead of, or in addition to, the holes in tube or bar 129. Alternatively, one end of tube or bar 129 could be permanently or semi-permanently fixed in one piece of longitudinal member 113, so that removable transverse pin 131 is located at the other end of tube or bar 129. As another alternative, tube or bar 129 could contain spring loaded pegs that expand into holes 131 when the appropriate length of longitudinal member 113 has been reached.

It will also be recognized that other mechanisms can be used to provide adjustability to the length of the longitudinal member 113, including a threaded telescoping mechanism, e.g., where two pieces of longitudinal member 113 are threaded together, and the length of the overall piece can be varied by tightening or loosening the threads, or where the ends of longitudinal member 113 are threaded, and the tube or bar 129 is correspondingly threaded, so that the length of the overall piece can be varied by tightening or loosening the threaded joint.

Similar adjustability mechanism can be provided for one or more transverse members 115.

Figure 4:
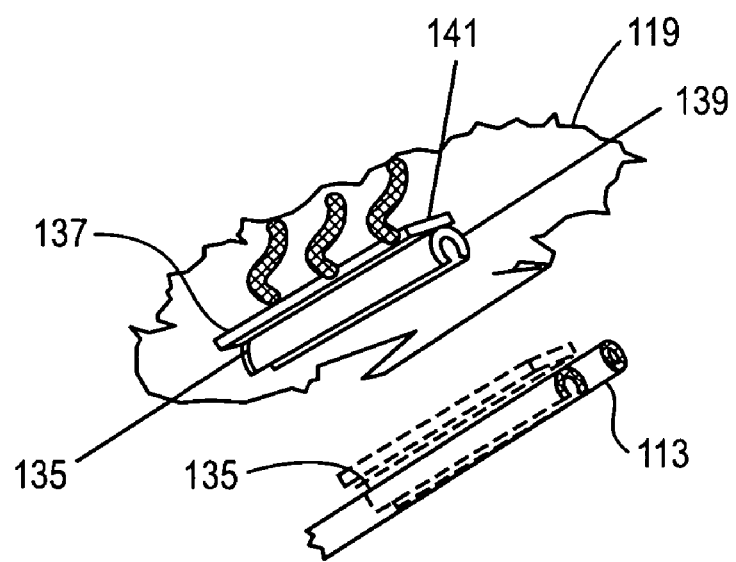
FIG. 4 is a magnified view of a portion of the embodiment of the plant protection apparatus of FIG. 1, showing one embodiment of a connector between the first and second enclosing portions.

First covering 119 and/or second covering 121 can be secured to the first or second enclosing portions, respectively, by a variety of mechanisms. One embodiment for securing the coverings is shown in FIG. 4. Clamp 135 contains a flat portion 137 and a curved portion 139. Curved portion 139 is adapted to clamp onto the outer surface of longitudinal member 113 (shown) or transverse member 115 (not shown). Curved portion 139 is made of a material sufficiently flexible that it can be forced over the longitudinal or transverse member without fracturing, and sufficiently rigid that it will retain its shape and remain fixed to the longitudinal or transverse member by a pressure fit. Suitable materials include polymers, such a polyolefins, polyesters, polyamides, and the like. Flat portion 137 is adapted to attached to coverings 119 or 121. It may be permanently affixed to these coverings, e.g., by adhesive or other means, or more desirably, detachably affixed to the coverings, e.g., by a strip of hook and loop closure material (e.g., Velcro), shown as strip 141. A corresponding piece of material is then affixed to the appropriate place on coverings 119 or 121.

Figure 5A:
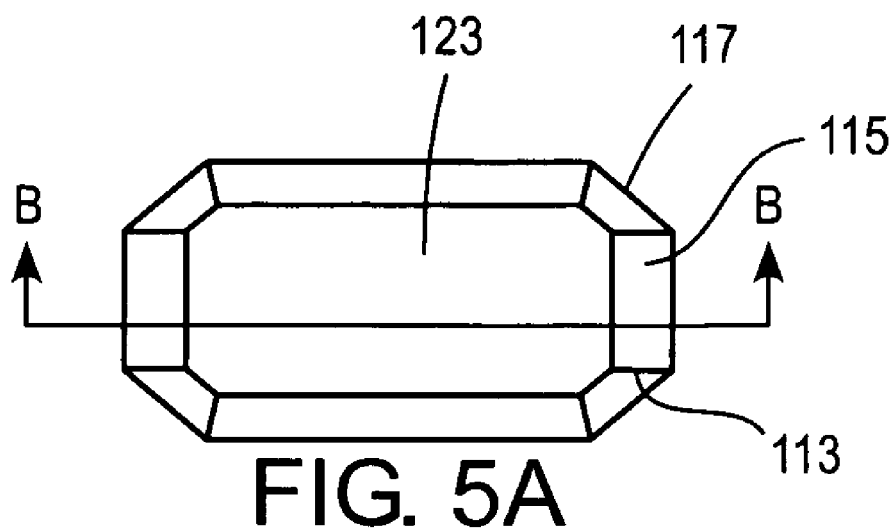
FIGS. 5a and 5b are a top plan view and a cross-sectional view, respectively, of another embodiment of the plant protection apparatus disclosed herein, suitable for protecting multiple plants.
Figure 5B:
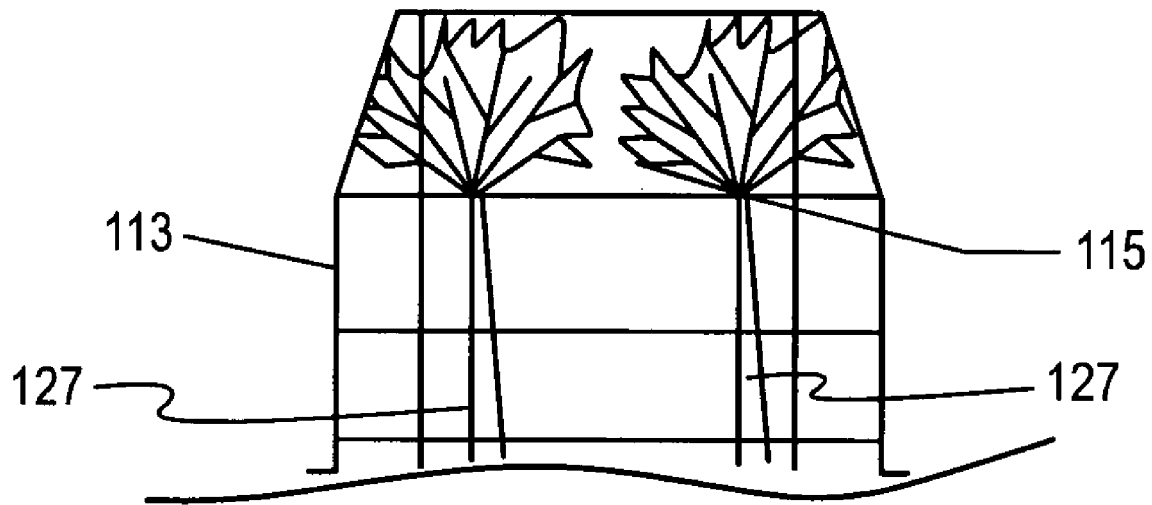

As indicated above, the adjustability of the device disclosed herein provides the ability to protect a wide variety of plants from frost, ice, and wind damage. By adjusting the transverse elements 115, e.g., the device can be adjusted to protect multiple plants, as illustrated in FIGS. 5a and 5b.

First enclosing region 101 can be connected to second enclosing region 107 by a variety of techniques, including permanent techniques, such as spot welding, and detachable techniques, such as shock-cording, pressure-fit joining, and the like. longitudinal members and transverse members can be connected via similar techniques, desirably spot-welding for members forming a single panel, and detachable techniques for connecting members of two different panels.

The device disclosed herein can be deployed by arranging the appropriate number of panels around the plant or plants to be protected, and connecting them together. The resulting framework is then anchored to the ground using anchoring means as described above. Finally, first and second coverings can be wrapped around the framework and secured thereto, e.g., using the claming devices described herein. Further securing can be done by tightening any drawstrings associated with the coverings. The resulting device protects plants against the damage caused by the elements, in particular against ice damage caused by, e.g., freezing rain.

The embodiments of the device having been described herein with respect to their particular embodiments and with respect to the drawings, it will be apparent that many variations and other embodiments are possible and that these alternatives fall within the scope of the appended claims and equivalents thereof.

What is claimed is:

1. An adjustable protective enclosure for trees or shrubs, comprising:
    a first enclosing portion having a upper region, and a lower region disposed below the upper region and adapted to contact the ground, and comprising a plurality of longitudinally extending panels, each panel comprising a plurality first longitudinal members and a plurality of first transverse members, wherein
        the first longitudinal members and the first transverse members of a panel are attached to one another to form one or more first rigid frameworks;
        at least a portion of the longitudinal members or at least a portion of the transverse members, or both, are adjustable in length;
        each panel is adjustably attached to two adjacent panels to enclose one or more trees or shrubs;
    a second enclosing portion disposed above the first enclosing portion and attached to the first enclosing portion in the upper region of the first enclosing portion, and comprising a plurality of second longitudinal members and a one or more second transverse members, wherein the second longitudinal members and second transverse members form one or more second rigid frameworks;
    a first covering removably disposed around the first enclosing portion;
    a second covering removably disposed around the second enclosing portion.

2. The adjustable protective enclosure of claim 1, wherein the first longitudinal members, the first transverse members, the second longitudinal members, the second transverse members, or a combination thereof, comprise one or more rigid rods, tubes, or a combination thereof.

3. The adjustable protective enclosure of claim 1, wherein the adjustable longitudinal members comprise a telescoping hollow tube, and one or more stops located within the hollow tube.

4. The adjustable protective enclosure of claim 1, wherein the adjustable transverse members comprise a telescoping hollow tube, and one or more stops located within the hollow tube.

5. The adjustable protective enclosure of claim 1, further comprising one or more connectors for removably attaching the first covering to the first enclosing portion or for removably attaching the second covering to the second enclosing portion, said one or more connectors comprising a curved portion adapted to clamp onto the outer surface of a longitudinal or transverse member of the first or second enclosing portion, and a flat portion adapted to attach to the first or second covering.

6. The adjustable protective enclosure of claim 5, wherein the connector removably attaches to the longitudinal or transverse member of the first enclosing portion, or to the longitudinal or transverse member of the second enclosing portion, or both.

7. The adjustable protective enclosure of claim 1, wherein the first enclosing portion, or the second enclosing portion, or both, forms a polygon around the tree or shrub.

8. The adjustable protective enclosure of claim 1, wherein each panel forms a face of the polygon.

9. The adjustable protective enclosure of claim 1, wherein the first covering comprises a woven or nonwoven fabric, or a film.

10. The adjustable protective enclosure of claim 1, wherein the second covering comprises a woven or nonwoven fabric, or a film.

11. The adjustable protective enclosure of claim 1, wherein said first enclosing portion and said second enclosing portion form an integrated unitary framework.

12. The adjustable protective enclosure of claim 1, wherein said first enclosing portion is detachably attached to said second enclosing portion.

13. The adjustable protective enclosure of claim 1, wherein the first covering, the second covering, or both, comprise a woven or nonwoven fabric, or a film, and a means for drawing together an edge of the fabric or film.

14. The adjustable protective enclosure of claim 1, further comprising one or more drawstrings associated with said first covering, said second covering, or both.

15. The adjustable protective enclosure of claim 1, further comprising shockcording adapted to detachably attach the first enclosing region to the second enclosing region.

* * * * *